United States Patent
Kendrick et al.

[11] Patent Number: 5,318,073
[45] Date of Patent: Jun. 7, 1994

[54] ORIFICE PLATE SEAL

[75] Inventors: Ray Kendrick, Katy; Angela M. Floyd, Montgomery, both of Tex.

[73] Assignee: Daniel Industries, Inc., Houston, Tex.

[21] Appl. No.: 896,540

[22] Filed: Jun. 9, 1992

[51] Int. Cl.$^5$ .............................................. F15D 1/08
[52] U.S. Cl. ................................ 138/44; 138/94.3
[58] Field of Search ............... 138/40, 43, 44, 45, 138/46, 104, 94.3; 73/861.61; 137/625.33; 277/12, 206 R

[56] References Cited

U.S. PATENT DOCUMENTS

| | | | |
|---|---|---|---|
| 1,248,057 | 11/1917 | Bailey | 138/44 |
| 1,731,404 | 10/1929 | Wetherill | 138/44 |
| 1,996,192 | 4/1935 | Daniel | 138/44 |
| 2,050,544 | 8/1936 | Robinson et al. | 138/44 |
| 2,214,959 | 9/1940 | Hamer | 138/44 |
| 2,217,216 | 10/1940 | Davis | 138/44 |
| 2,728,355 | 12/1955 | Dahl | 138/45 |
| 2,815,041 | 12/1957 | Rimsha et al. | 138/45 |
| 3,126,917 | 3/1964 | Hodgeman et al. | 138/44 |
| 3,995,664 | 12/1976 | Nelson | 138/43 |
| 4,478,251 | 10/1984 | Sanchez et al. | 138/44 |
| 4,557,296 | 12/1985 | Byrne | 138/44 |
| 4,593,915 | 6/1986 | Seger et al. | 277/12 |
| 4,633,911 | 1/1987 | Lohn | 138/44 |
| 4,754,897 | 7/1988 | Brace | 138/45 |
| 5,027,861 | 7/1991 | Gute | 138/45 |
| 5,094,272 | 3/1992 | Foster et al. | 138/44 |

Primary Examiner—James E. Bryant, III
Attorney, Agent, or Firm—Alton W. Payne

[57] ABSTRACT

An orifice installation for sealing a plate within a fitting is disclosed. The plate has a seal surrounding its outer circumference. The seal has a large base area of elastomeric material and an outer and inner periphery face. A central circumferential extension larger than the distance in the fitting for permitting entry of a plate carrying device is formed between the shoulders. Circumferential indentations formed in the base separate the shoulders from the extension.

17 Claims, 6 Drawing Sheets

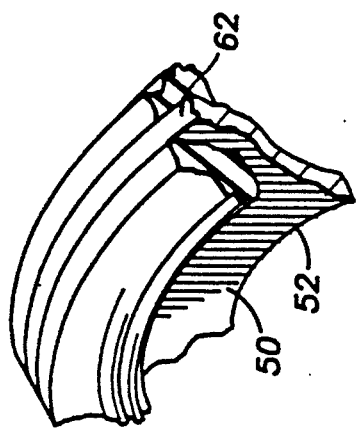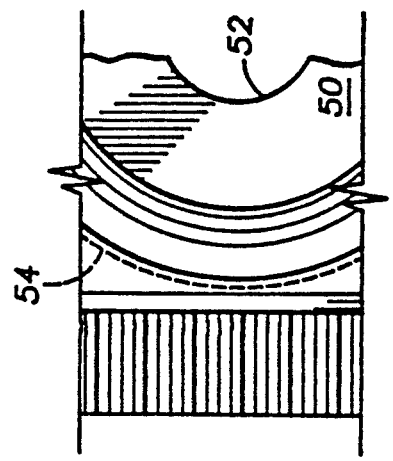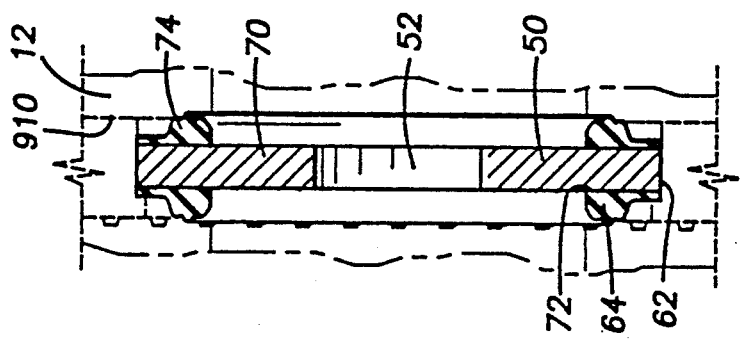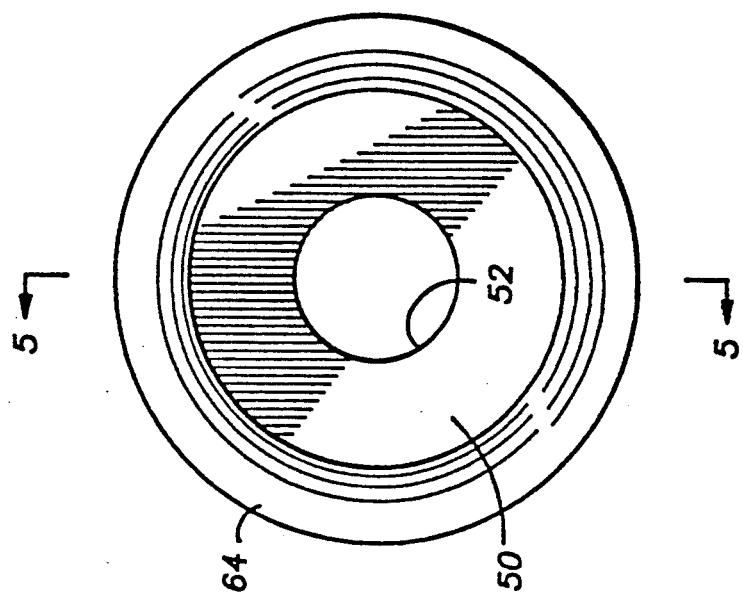

ORIFICE PLATE SEAL

FIELD OF THE INVENTION

The invention relates to flow measurement devices, and in particular, to flow measurement devices using orifice plates and differential pressure as a basis of the flow measurement.

BACKGROUND OF THE INVENTION

Pipelines are used to transport fluids such as the production fluids from oil and gas wells. Because the measurement of these fluids is important, orifice plates are installed in special fittings which are installed in-line with pipeline sections. Some fittings may permit an orifice plate to be moved in and out of the flow stream without interruption of the flow through the pipeline. Other fittings permit orifice plates to be moved in and out of the pipeline only by interruption of flow.

The use of orifice measurement for flow has been known since ancient times. The basis of orifice measurement is to place a plate in a flow line, with the plate having an opening which is smaller than the opening of the flow line. By reading the upstream and downstream pressure on either side of the plate, and calculating the difference of pressure between the upstream and downstream pressures, one can infer the rate of flow in the pipe line.

The accuracy of the measurement given by the orifice is dependent on many factors, including the ratio of the orifice hole to the diameter of the pipe, the length of straight run of the upstream and downstream pipe or tube sections on either side of the orifice, the eccentricity of the orifice hole in the pipe or tube, leakage of fluid around the plate, and the like.

As part of the effectiveness of an orifice plate, it is important to seal around the circumference of the plate and to effect a seal within the interior of the orifice fitting to ensure that all the flow passes through the plate bore and is measured. Accordingly, the sealing surface of the seal must seal against the machined seat in the orifice fitting, typically on the downstream side. In the prior art, the seal slot in the fittings is held to a closely-machined tolerance. However, variations to the slot may occur because of casting variations in the sand castings used as raw material for orifice fitting bodies. Also, sometimes fittings are subjected to unusual loads in pipeline applications and some seat expansion or deflection can occur. Further, old fittings in use are always subject to erosion or corrosion and therefore pitting in the sealing surfaces. In the prior art, standard, rounded (or, in some cases, flat) seal contours are used. These contours are not forgiving in nature. Displacement of a solid, molded piece of elastomer is not always easily accomplished. It is a necessity to enter the slot as originally machined without undue friction to avoid damaging the seal. In such a case corroded seats also prevent a uniform flow of rubber and result in the sealing problem as the rubber is unable to conform to the sealing surface of such a corroded seat.

Accordingly, because the object of an orifice fitting is to hold and effect the seal on an inserted orifice plate and seal assembly, the deflection referenced above, caused by internal pressure or other distortions, will allow some seal leakage in certain instances. Therefore, because the sealing faces of the seats within the fitting are machined parallel, any deflection that causes a "non-parallel" seat face deflection can contribute to leakage around the seal and seat face. Thus, the seal design of the prior art of the single rounded, or flat, elastomer surface to contact the fitting seat places a large mass in the seal "bead" and compresses only with considerable force. Increasing the width of this style seal to allow for the widening of the seat gap under pressure creates unacceptable difficulty in inserting the "thicker" seal in a non-pressurized fitting where there is no seat gap expansion.

There is, therefore, need for an orifice plate and seal combination that permits sealing even in the presence of distortions in the slot and abrasions in the sealing surface.

In other art, such as the molded seal incorporated into the bottom of the piston of a Daniel's piston-controlled check valve line, non-bead or flat seals have been used. This enhances sealing under low pressure conditions and when "sand" from flowing wells is encountered. This type of molded seal is a modified three-lobe design and has been used in the prior art for special applications. Another seal that does not use a single bead or flat design is that designed by Parker, designated a Gask-O-Seal, a molded rubber-to-metal gasket used in the body or top closure of certain high pressure (2500 ANSI) Daniel's senior fittings in the prior art. This molded seal is not a three-lobe design.

Further, there has been a series of meetings to significantly revise API/AGA standards, which would constitute a revision to *Manual of Petroleum Measurement Standards*, Chapter 14, "Natural Gas Fluids Measurement", which includes Section 3, "Concentric, Square-edged Orifice Meters". The revised Section 3 may become an update and would then become a revision to ANSI Standard ANSI/API 2530; i.e.: AGA Report No. 3.

These new requirements have been adopted by some companies even though additional costs will be attendant with mechanical changes associated with the requirements. As discussed above most orifice plate holding devices other than flanges require some manner of plate/seal/carrying device combination. The most common seal of this type is the elastomeric seal which is assembled around the orifice plate. Industry standards have changed in respect to this seal.

Prior to the development of the seal of the present invention, field tests using actual conditions showed that prior art seal profiles sealed bubble tight at a differential pressure as low as 25 inches of water. However, the changes to the API 14.3 standard discussed above which covers seals of this type have moved customers to request fittings that seal bubble tight at as low as 5 inches of water. The theory of operation of the existing seal profile of the prior art is that the elastomer deforms to any irregular profiles in the fitting seat face to effect a sealing engagement. The differential pressure created as the seal makes up in the initial condition causes a net force in the direction of decreasing pressure, thus forcing the seal to take the profile of the fitting seat to stop any fluid flow around the seal. The seal must thus be responsive to lower differential pressure to meet new industry demand.

Therefore, an object of the present invention is to operate as a bubble tight seal with minimum differential pressure of as low as 5 inches of water but still be able to operate at high maximum differential pressures, such as 200 inches of water.

SUMMARY OF THE INVENTION

The present invention discloses the use of an orifice plate introduced within the body of an orifice fitting while managing the sealing of the plate in the orifice fitting. For sealing purposes, the seal is more than a "bead" profile. A small extension extends beyond the normal seal surface of a "bead" profile. This extension has a reduced contact surface of elastomeric material to allow easy insertion in standard, as machined slots, yet is of a size to contact the sealing surface of the seat if instead the slot is unusually wide. To further reduce the effort of insertion into standard, as machined slots for seats, the profile on either side of the extension is relieved to allow displacement of the extension. The seal profile is also designed to control plate movement due to flowing differential applied across the orifice plate by larger mass shoulders bounding the extension.

BRIEF DESCRIPTION OF THE DRAWINGS

For a further understanding of the nature and objects of the present invention, reference is made to the following drawings in which like parts are given like reference numbers and wherein:

FIG. 4 is a front view of the orifice plate and seal;

FIG. 5 is a cross-sectional view taken along section lines 5—5 of FIG. 4;

FIG. 6 illustrates a detail of the orifice plate and seal;

FIG. 7 illustrates a detail of the orifice plate and seal interfaced with a plate carrying device;

DESCRIPTION OF THE EMBODIMENTS

The present invention discloses an orifice plate carrying device and orifice fitting and method for centralizing the orifice plate and carrying device in an orifice fitting.

Figure 1:
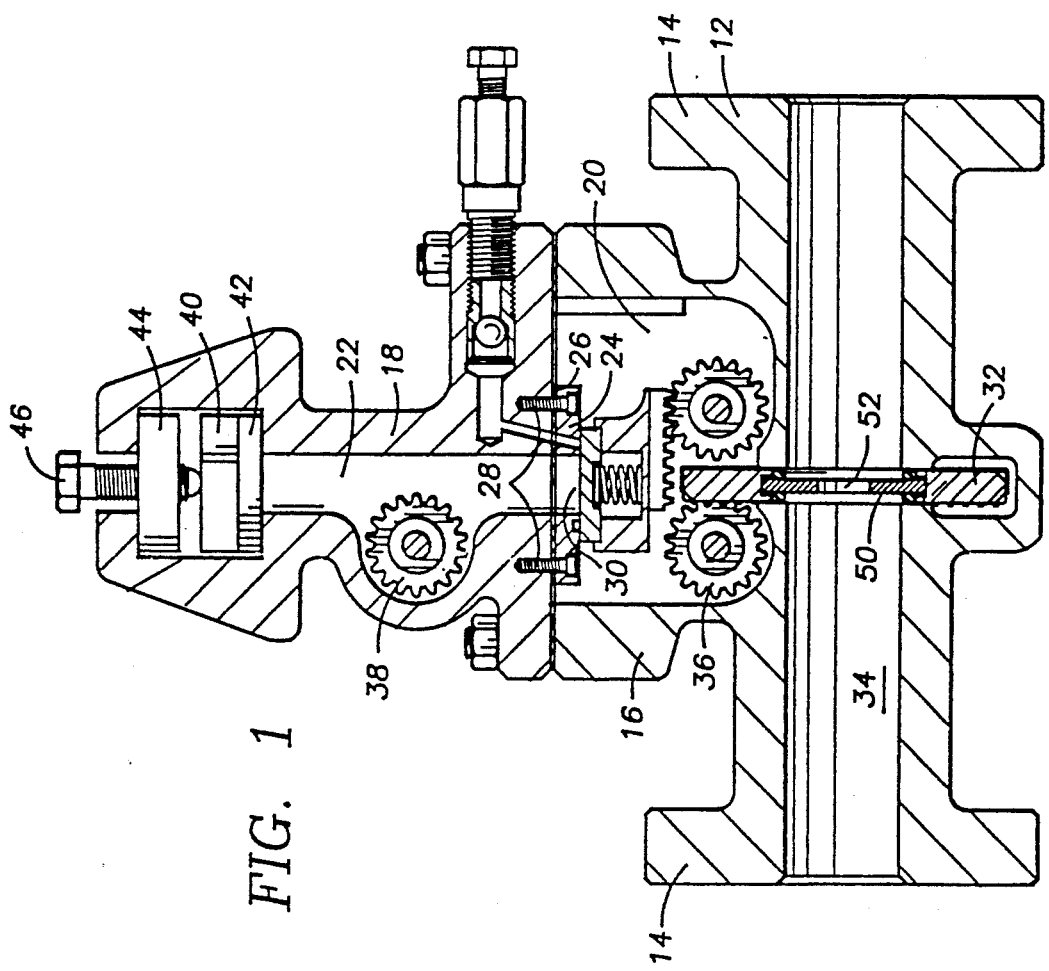
FIG. 1 illustrates a sectional elevation view of an orifice fitting showing a vulcanized version of the seal of the preferred embodiment.
Figure 3:
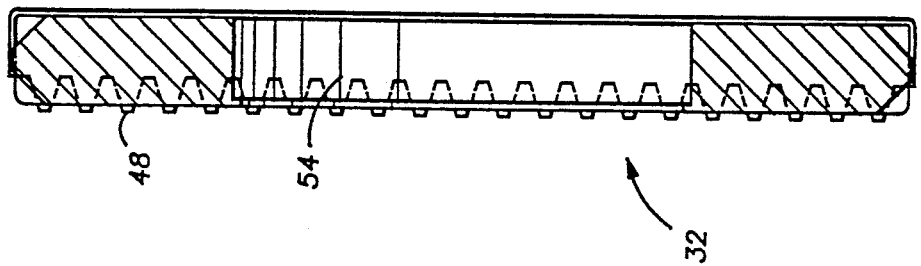
FIG. 3 is a cross-sectional view taken along section lines 3—3 of FIG. 2.

FIG. 1 illustrates an orifice fitting 12. As illustrated, orifice fitting 12 includes flanges 14 which are used to bolt fitting 12 to sections of the pipeline (not shown). Alternately, the orifice fitting 12 may include weld bevels (not shown) and may be welded directly into the pipeline, or a combination of a flange and a weld bevel may be used to place the fitting into the pipeline.

Orifice fitting 12 also includes body 16 and top 18. Body 16 encloses lower chamber 20 which is in fluid communication with fluid 34 from the interior of the pipeline, and top 18 encloses upper chamber 22. Valve seat 24 and valve seat gasket 26 are connected to top 18 with valve seat screws 28. Aperture 30 defines an opening through valve seat 24 and valve seat gasket 26 which permits the communication of fluids therethrough.

Valve seat 24 is illustrated as a generally rectangular plate having a lower base or surface which substantially constitutes a flat plane surface. Valve seat 24 can be constructed from alloy iron or other material. Valve seat gasket 26 can be constructed from a gasket material, such as graphite or asbestos, and valve seat screws 28 can be constructed from a chemically treated steel or alloy.

As illustrated in FIG. 1, orifice plate carrying device 32 is located in communication with pipeline fluid 34. Orifice plate carrying device 32 can be raised and lowered within orifice fitting 12 by operating lower drive 36, comprising a gear shaft and pinions, and upper drive 38, also comprising a gear shaft and pinions.

Upper chamber 22 is sealed from the ambient environment with sealing bar 40 and sealing bar gasket 42 which are retained with clamping bar 44 and clamping bar screws 46.

Figure 2:
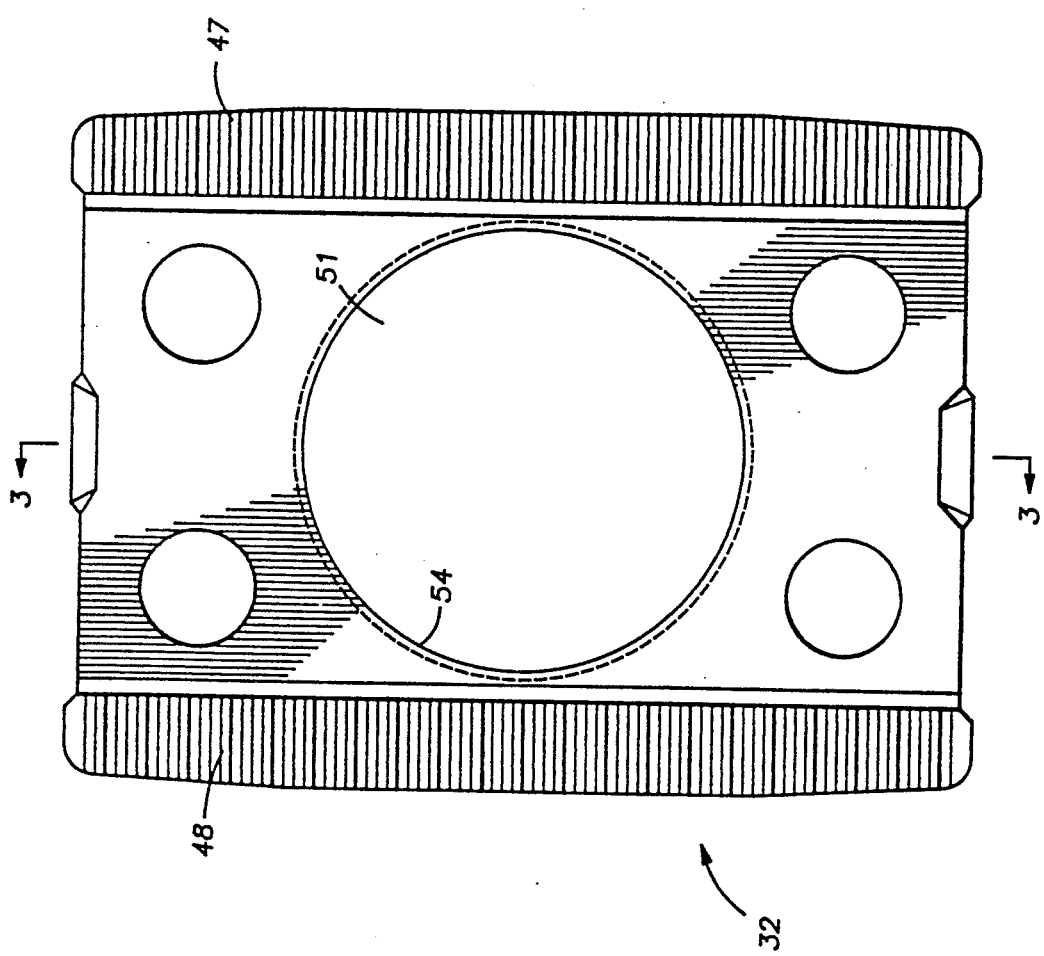
FIG. 2 is a front view of a plate carrying device for use within an orifice fitting.

As illustrated in FIG. 2, orifice plate carrying device 32 comprises parallel racks 47, 48, adapted to interface with lower drive 36 and upper drive 38. An orifice plate 50 which normally has a center hole 52 as best seen in FIGS. 4, 5 and 7 is located interior to racks 47, 48. Orifice plate carrying device 32 has an opening 51 to receive orifice plate 50 therein.

Orifice plate carrier 32 has an inner circumference 54 for opening 51 which is generally circular in shape.

As best seen in FIG. 5, orifice plate 50 is generally circular in shape having outer circumference 62. This is a "universal" plate standard, however the invention may be used with any plate. For example, plate 50 may have extensions, which are non-universal, to fit in grooves of a plate holder.

Orifice plate 50 is preferably made of metal and orifice plate carrying device 32 is also preferably made of metal.

As best seen in FIGS. 4 and 5, orifice plate 50 is normally surrounded by an elastomeric gasket 64, such as rubber. The sides 0 of plate 50 are circumscribed at their extreme outer surfaces immediately adjacent to circumference 62 by interior sides 72 of seal 64. Seal 64 is shaped such that its two exterior side or face surfaces 74 form a seal with the interior surfaces of fitting 12. The orifice plate 50 and seal 64 mounted on it are sized to fit snugly within opening 51.

The sealing device 64 may be any elastomeric material, such as rubber. Such elastomeric material may be vulcanized onto orifice plate 50 or may be form-fitted around orifice plate 50 as is appropriate depending on size.

The basic principles of placing the orifice plate within the plate carrier are preferably used in the preferred and alternate embodiments of the present invention which are described below. As illustrated in FIG. 1, an orifice plate carrying device 32 is located in communication with pipeline fluids 34. Orifice plate carrying device 32 can be raised and lowered within orifice fitting 12 by operating lower drive 36 and an upper drive 38, as in FIG. 1. In operation, orifice plate 50 is assembled with plate holder 32 as discussed above. Once this assembly has been accomplished, it is introduced into fitting 12 as gears 38, 36 lower the plate carrier 32.

Figure 8:
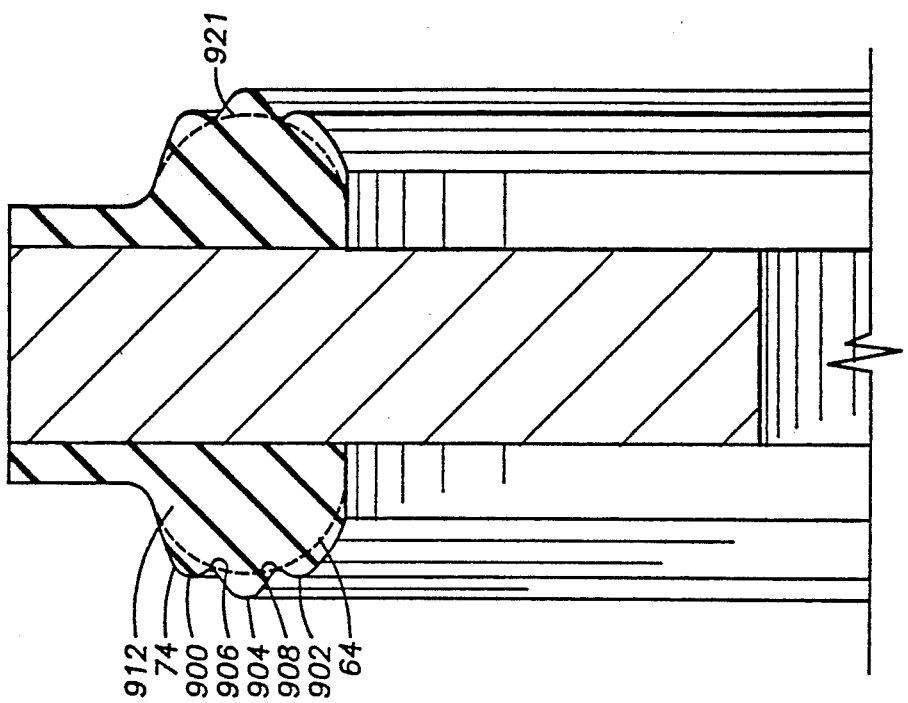
FIG. 8 is a side view having a preferred profile of the seal, distinguished from the "bead" seal of FIGS. 9 and another type of prior art seal of FIG. 10.
Figure 12:
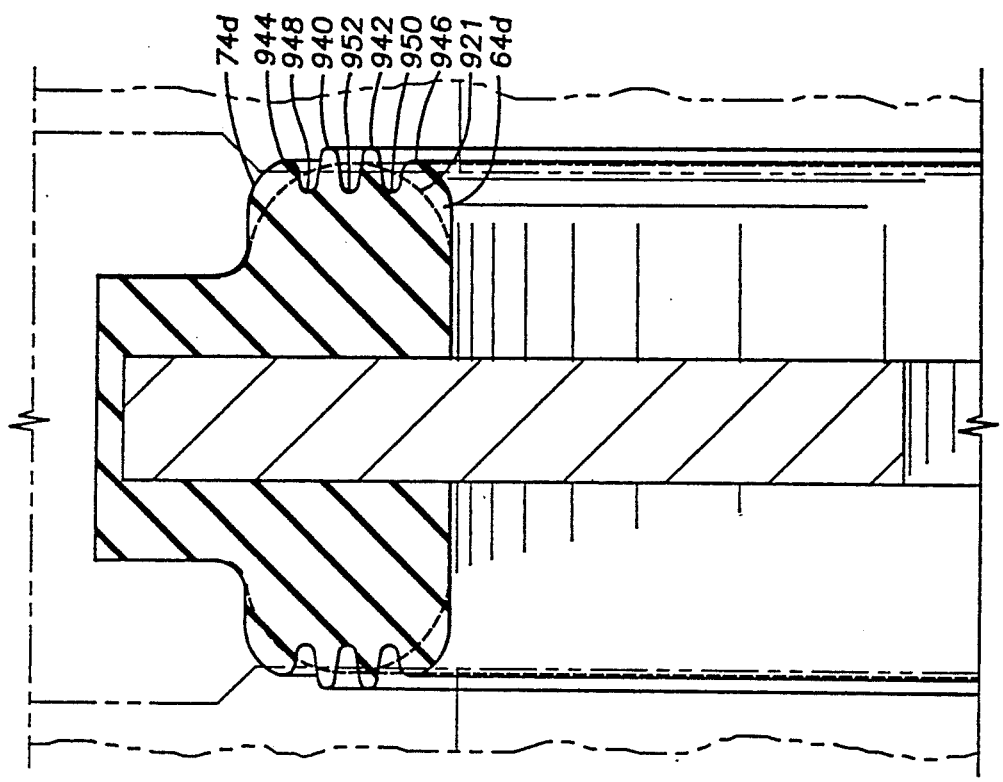
FIG. 12 is a side view showing an alternate embodiment of the seal of the present invention.
Figure 11:
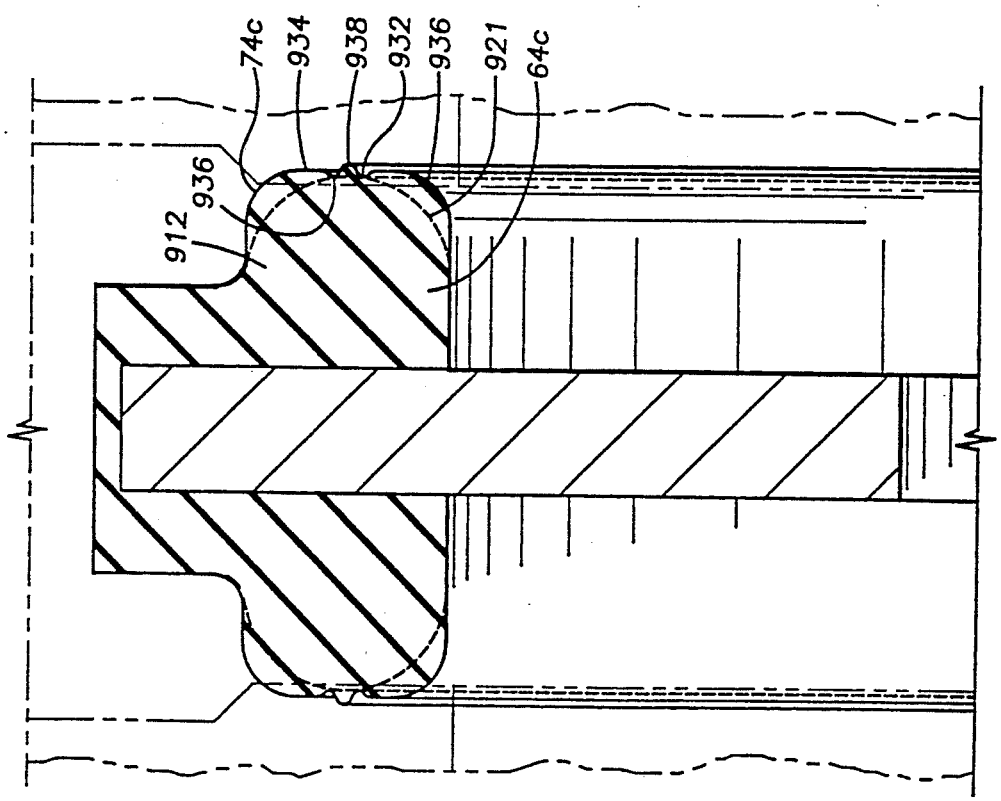
FIG. 11 is a side view showing an alternate embodiment of the seal of the present invention.

The contour of the preferred seal as shown in FIG. 8 is, as is the contour of the other FIGS. 11 and 12, capable of being used on fittings of the prior art. Such a prior art fitting is shown in FIG. 1. Accordingly, the dimpled contours as shown in FIGS. 8, 11 and 12 may be used in fittings with wide seal slots, as well as fittings machined to narrower dimensions. As discussed below in the detailed structure, the dimpled contours of FIGS. 8 and 11-16 allow a seal of greater than standard width, since the seal may be effected only as a result of initial contact of the leading edge of the extended middle protrusion(s) of the various seals described below. Accordingly, when the seat is narrow, the relief contours on each side of the extended, middle protrusion(s) allow for the displacement of the material, such as rubber, while still effecting a seal. The appropriate diameter or hardness is a matter of design objective and to some extent may depend on the type of pitted surfaces of the seats to provide a seal that is described structurally below. Thus, as described structurally below, the middle extension(s) extends beyond the normal seal surface and is thus added to the sealing profile. The durometer of the material of the seal should preferably be in a range between 75 and 90.

Figure 16:
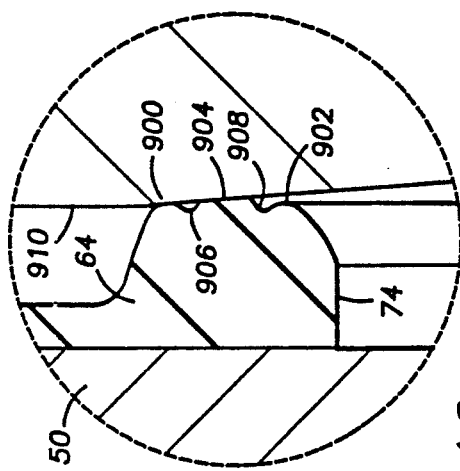
FIG. 16 is a second detail of FIG. 14, showing action of the seal in a wider, angular gap.
Figure 15:
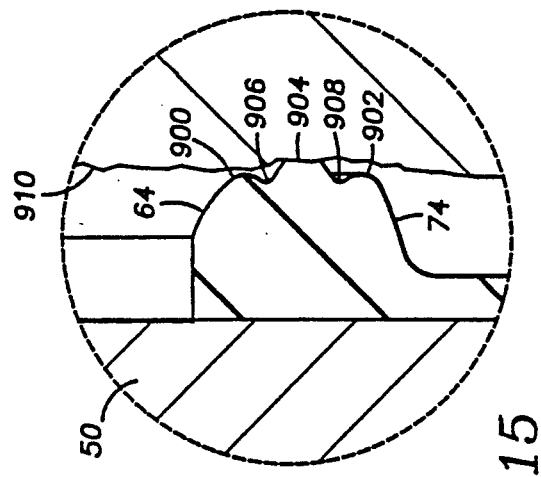
FIG. 15 is a first detail of FIG. 14, showing action of the seal in an irregular gap.
Figure 14:
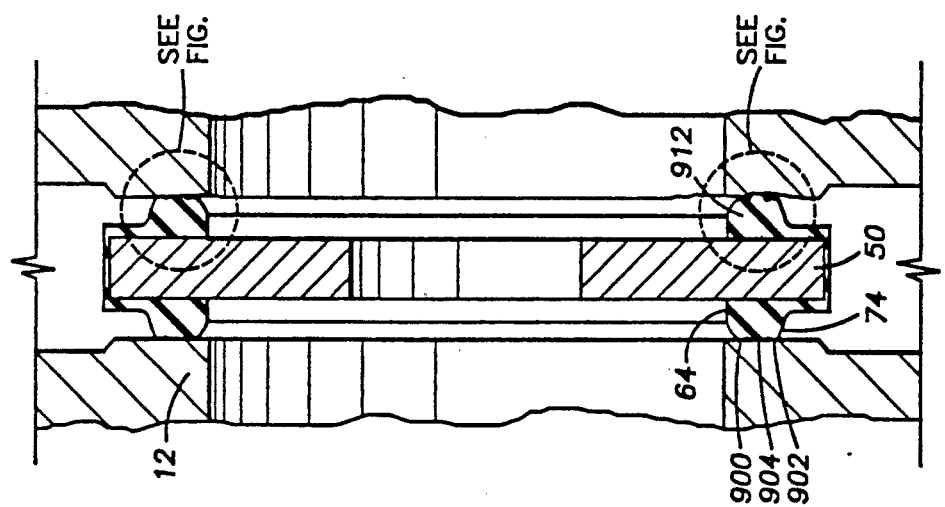
FIG. 14 is a side cross-sectional view of the seal mounted on the plate of FIG. 13 shown in various sealing situations against the faces of the slot generally depicted in FIG. 1.

As shown in FIGS. 8 and 13-16, seal 64 is mounted on orifice plate 50 and has side faces or profiles 74. Side faces 74 seal with interior surfaces of fitting 12. Side faces 74 include enlarged shoulders 900, 902 disposed on either side of a middle extension 904. Enlarged shoulders 900, 902 should be at least equal to the width of a machined passage and provide support to prevent too large a movement of the plate when differential pressure is applied. For gaps wider than machined passages, the shoulders 900, 902 may be smaller than the width of the gap. Indentations 906, 908 are formed between shoulders 900, 902, respectively, and middle extension 904. Extensions 906, 908 are sized to permit displacement of a portion of the material of the middle extension 904 upon sealing engagement, as shown in FIGS. 14-16. Middle extension 904 is sized sufficiently in extension from orifice plate 50 to maintain seal engagement with an imperfect seat face 910 of fitting 12 (FIG. 15).

Figure 10:
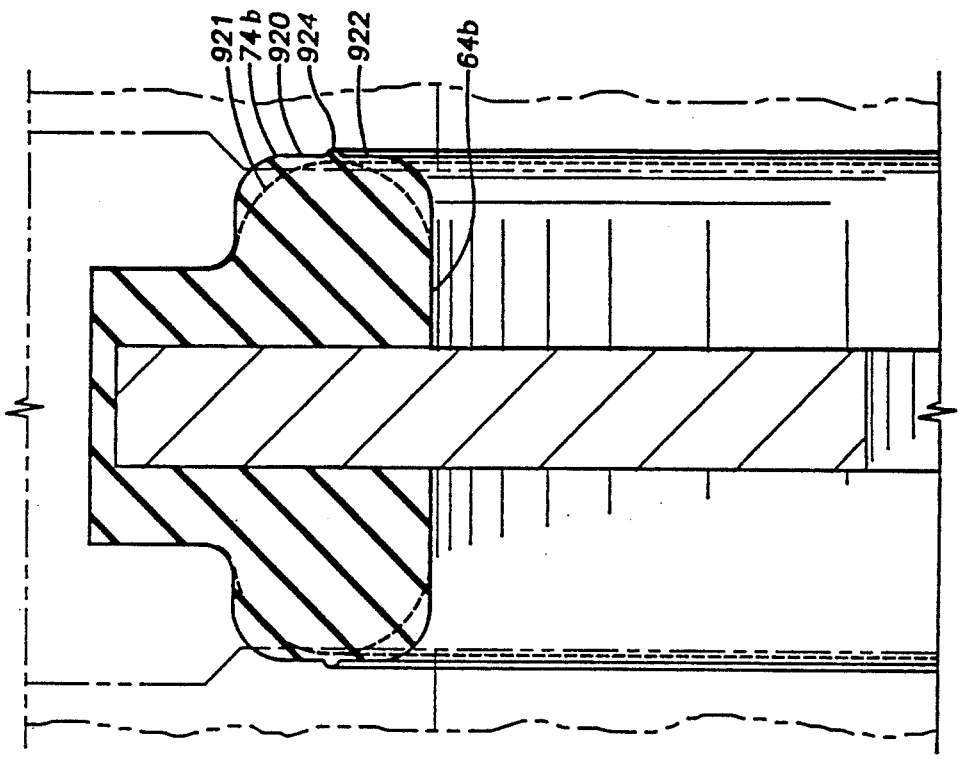
FIG. 10 is a side view of another profile of a seal of the prior art.
Figure 13:
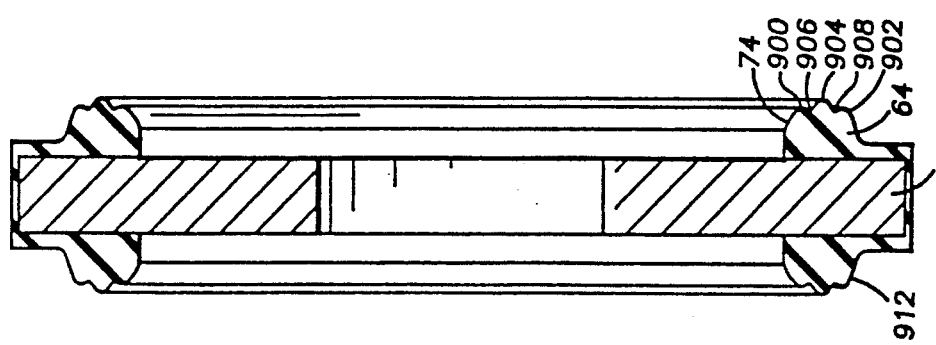
FIG. 13 is a side cross-sectional view of the seals of the preferred profile mounted on a plate showing a removable version of the seal.

In operation, the seal should first be considered at zero pressure (FIG. 13). As the seal 64 slides through the seat area of fitting 12, such as seat area 910, the outer shoulder 902 acts as a wiper to remove any surface debris. After the seal 64 is fully seated, as for example in FIG. 1 or 14, the middle extension 904 which has been increased in overall seal width from the seals 64a, 64b of the prior art as shown in FIGS. 10 and 11, respectively, is compressed to form a leak-free path across the seal surface of extension 904 and the seat surface, such as seat surface 910. Because the cross-sectional area of the middle extension 904 contact surface with the seat of fitting 12 is significantly less than the contact surface for either seal 64a or seal 64b, less force and, therefore, less pressure, from the line acting on the orifice plate 50 is required to maintain sealing engagement between seal 64 and the seat of fitting 12. The appropriate dimensions for the middle extension 904 should be set to maintain a compromise between a minimal contact surface and energy requirements to set the seal 64 and yet maintain a sufficiently robust design that is not vulnerable to nicks and scratches in the contact surface, such as surface 910. Thus, the force required to effect a bubble tight seal is a function of the amount of elastomer in contact with the seat face. By reducing the area of initial contact, the preferred embodiment of the present invention lowers the amount of differential pressure required to effect a bubble tight seal, allowing the seal 64 to effect a bubble tight seal within, for example, a minimum differential pressure of 5 inches of water.

There is an additional restraint on the design of seal 64 because the compression of the elastomer of middle extension 904 by differential pressure must not allow the orifice plate 50 to move too far toward or away from the pressure tap holes (not shown in the drawings) as specified by API 14.3. This latter requirement is in opposition to the sealing requirement. Thus the design had to resist the compression force created by maximum differential pressure of, for example, 200 inches of water. In order to accomplish this, the amount of elastomer in contact with the fitting seat face, as well as its thickness, has to be such that the elastomer would not compress more than the seal 64a or seal 64b, thus restricting the movement of the orifice plate 50. Thus the middle extension 904 is relatively small in order to respond to minimum differential pressure to effect an initial seal, and the base 912 must be thick to keep the elastomer from deforming too much at maximum differential pressure. For example, the effective cross-sectional area of middle extension 904 to base 912 is typically between 1.75 and 0.75; and the ratio of the height of middle extension 904 to shoulders 900, 902 is typically between 2.25 and 1.25; and the ratio of the height of the middle extension 904 to the depth of indentations 906, 908 is between 1.50 and 1.00; and the ratio of the volume of base 912 to the shoulders 900, 902 and extension 904 is between 1.75 and 1.00. Defining "squeeze" as the percent distortion of the middle extensions 904 from freestanding (as in FIG. 13), the squeeze of seal 64 is between 0.3% and 8% in inserting the seal 64 prior to the fluid differential pressure further distorting the seal 64. This is distinguished from "squeeze" as that term is used for conventional O-rings of the prior art such as seal 64a where "squeeze", as the distortion of the O-ring, must be at least 0.007 inches.

Figure 9:
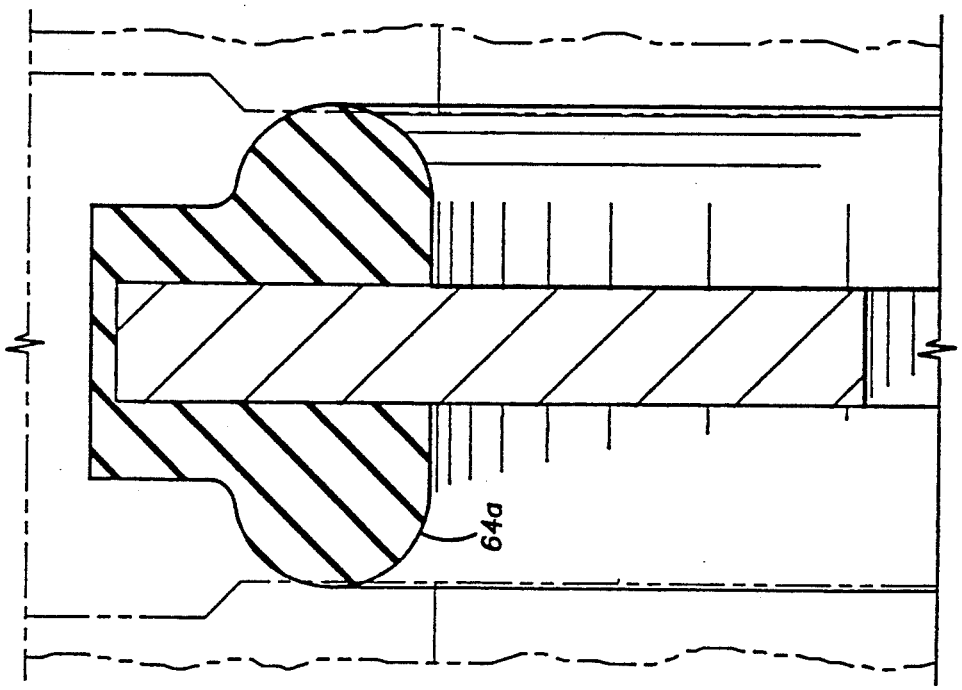
FIG. 9 is a side view showing the profile of the "bead" seal of the prior art.

As shown in FIG. 10, a seal 64b of the prior art does not have indentations 906, 908 but has flat surfaces 920, 922 on opposite sides of a smaller middle extension 924. The profile 921 of seal 64a of FIG. 9 is shown superimposed over this seal of the prior art.

As shown in FIG. 11, another alternate embodiment has shallower indentations 932, 936 and thus shoulders 934, 936 are less pronounced, as well as middle extension 938 being less pronounced. Thus seal 64c having side faces 74c is less pronounced. As may be understood in the art, additional variations may also be used For example, FIG. 12 shows the seal 64d having side faces 74d in which there are a plurality of middle extensions 940, 942 bounded on either side by extended shoulders 944, 946 with, for example, indentations 948, 950 of substantially the same depth as indentations 930, 932. An additional indentation 952 separates middle extensions 940, 942. It is important that the seal extend further and actuate, while still being able to be cranked into the fitting without stripping the gears The embodiments set forth herein are merely illustrative and do not limit the scope of the invention or the details therein. It will be appreciated that many other modifications and improvements to the disclosure herein may be made without departing from the scope of the invention or the inventive concepts herein disclosed. Because many varying and different embodiments may be made within the scope of the inventive concept herein taught, including equivalent structures or materials hereafter thought of, and because many modifications may be more in the embodiments herein detailed in accordance with the descriptive requirements of the law, it is to be understood that the details herein are to be interpreted as illustrative and not in a limiting sense.

What is claimed as invention is:

1. An orifice plate seal system for use with a fitting having a passage and a first and second seating surfaces in the passage, comprising:
    an orifice plate having an outer periphery face; and
    a seal surrounding said outer periphery face;
    said seal positioned to form sealing engagement with the seating surfaces;
    said seal being formed of flexible material and having a seal face opposite to at least one of the seating surfaces;
    said seal face having
    a circumferential inner shoulder and a circumferential outer shoulder,
    at least one middle circumferential extension located between said shoulders, the thickness of said seal at said extension being greater than the width of the passage,
    a first circumferential indentation between said outer shoulder and said extension, and
    a second circumferential indentation between said outer shoulder and said extension,
    said indentations sized to permit deformation of said extension without substantially increasing the width of said shoulders.

2. The orifice plate seal system of claim 1, wherein said flexible material is elastomer.

3. The orifice plate seal system of claim 1, wherein said shoulders are of the same width.

4. The orifice plate seal system of claim 1, wherein said ratio of the height of said middle extension to the height of said shoulders 2.25 and 1.25.

5. The orifice plate seal system of claim 1, wherein said indentations are of the same depth.

6. The orifice plate seal system of claim 5, wherein the ratio of the height of said middle extension to the depth of said indentations is between 1.50 and 1.00.

7. The orifice plate seal system of claim 1, wherein there is further included a base, said seal face rising from said base.

8. The orifice plate seal system of claim 7, wherein the ratio of the volume of said base to the volumes of said shoulders and said extension is between 1.75 and 1.00.

9. The orifice plate seal system of claim 7, wherein the ratio of the effective cross-sectional area of said extension to the effective cross-sectional area of such base is between 1.75 and 0.75.

10. The orifice plate seal system of claim 1, wherein there is a plurality of said middle circumferential extensions, each extension of said plurality being separated from said adjacent extension by an indentation.

11. The orifice plate seal system of claim 1, wherein there is included a second face identical to said seal face opposite to the second seating surface.

12. The orifice plate seal system of claim 1, wherein the passage is a machined passage and the width of said seal at each of said shoulders is at least equal to the width of the machined passage.

13. The orifice plate seal system of claim 1, wherein said flexible material has a durometer of between 75 and 90.

14. The orifice plate seal system of claim 1, wherein the range of squeeze of said middle extension of said seal is between 0.3% and 8%.

15. The orifice plate seal system of claim 1, wherein said orifice plate has a second outer periphery face and there is included a second seal surrounding said second outer periphery face.

16. The orifice plate seal system of claim 15, wherein said second seal is formed of said flexible material and has said seal face.

17. An orifice installation for measuring flow in pipes in which fluids may flow comprising:
    an orifice plate having an outer periphery face;
    a seal surrounding said outer periphery face;
    a plate carrying device having an interior opening sized to receive said orifice plate and said surrounding seal; and
    a fitting with an interior for holding said plate, said fitting having a passage for passing said plate and seal into said interior of said fitting, said passage having at least one seating surface;
    said seal being formed of flexible material and having a seal face opposite to at least one of said seating surfaces;
    said seal face having
    a circumferential inner shoulder and a circumferential outer shoulder,
    at least one middle circumferential extension located between said shoulders, the thickness of said seal at said extension being greater than the width of the passage,
    a first circumferential indentation between said inner shoulder and said extension, and
    a second circumferential indentation between said inner shoulder and said extension, and
    a second circumferential indentation between said outer shoulder and said extension,
    said indentations sized to permit deformation of said extension without substantially increasing the width of said shoulders.

* * * * *